W. R. HEIRONIMUS.
AIR BRAKE.
APPLICATION FILED JULY 9, 1908.
903,379.
Patented Nov. 10, 1908.
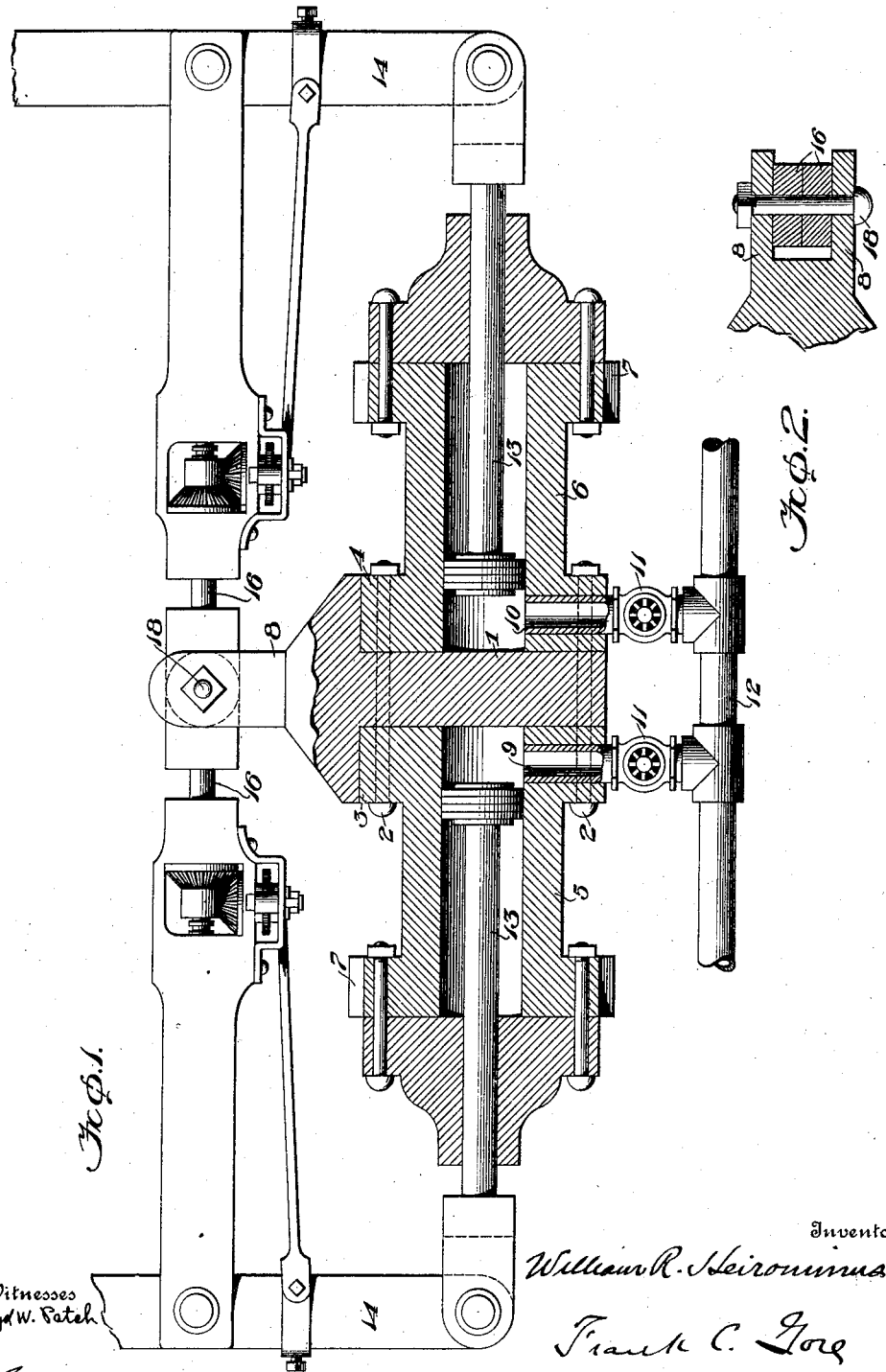

United States Patent Office.

WILLIAM R. HEIRONIMUS, OF EVANSVILLE, INDIANA.

AIR-BRAKE.

No. 903,379.　　Specification of Letters Patent.　　Patented Nov. 10, 1908.

Original application filed March 12, 1908, Serial No. 420,757. Divided and this application filed July 9, 1908. Serial No. 442,767.

*To all whom it may concern:*

Be it known that I, WILLIAM R. HEIRONIMUS, a citizen of the United States, residing at Evansville, county of Vanderburg and State of Indiana, have invented certain new and useful Improvements in Air-Brakes, of which the following is a specification.

My invention relates to air brakes.

The present invention has for its object the provision of an improved duplex structure adapted for use on electric cars where direct air pressure is employed to work the brakes, whereby if one air brake rigging breaks or becomes damaged, it can be immediately cut out and the brakes still operated with the remaining rigging.

The present application is a division of Serial Number 420,757, filed March 12, 1908, for slack adjusters for air brakes.

The most perfect embodiment of the invention which I have at this time devised is set forth fully hereinafter and the novel features recited in the appended claims, while in the accompanying drawings:

Figure 1 is a bottom view, largely in section, of the invention; and Fig. 2, a detail section showing the manner of connecting the extension rods to the head.

To a central casting of head 1 there are secured by bolts 2 the heads 3 and 4 of duplicate air cylinders 5 and 6 which have suitable brackets 7 for securement of the device to the bottom of the car. Projecting from the head 1 are lugs 8. Connecting with the heads 3 and 4 are branch pipes 9 and 10 provided with cut-off valves 11 and connected to the main air pipe 12. If either air brake rigging becomes damaged, the proper valve 11 will be closed and the brakes operated on the remaining cylinder, thus permitting the car to be continued in use until opportunity for repairs can be had, but ordinarily both valves 11 will be open to permit both cylinders to be used. In each cylinder is a piston rod 13 provided with the usual head to which the usual levers 14 for operating the brakes are pivoted.

The fulcrum rods 16 for the levers 14 are both secured by the same bolt 18 to lugs 8 which causes the pressure to be balanced and equalized and thus relieves the mechanism of much strain which would thus exist and the arrangement of the cylinders in connection with the head 1 obviates the use of separate cylinder heads, besides balancing the pressure or strain in connection therewith.

Ordinarily the valves 11 are both open and both cylinders are used to operate the brakes, and the air pressure is thus equalized, but should one of the brake riggings become damaged, or defective for any reason, it can be cut out by turning the valve 11 controlling its cylinder, and the cylinder and its mechanism still used to operate the brakes until repairs can be had.

Having thus described my invention, what I claim as new and desire to secure by Letters Patent, is:—

1. In an air brake mechanism, the combination of cylinders, pistons in said cylinders, fulcrum rods both connected to the cylinders and arranged so that the pressures on said rods will substantially balance each other, and brake operating levers pivoted to said fulcrum rods and operatively connected to the respective pistons.

2. In an air brake mechanism, the combination with a head and opposed cylinders engaged therewith, of fulcrum rods connected to said head so as to oppose or balance each other's pressure thereon, brake operating levers pivoted to said fulcrum rods, and pistons in the cylinders which are connected to the respective levers.

In testimony whereof, I hereunto affix my signature in presence of two witnesses.

WILLIAM R. HEIRONIMUS.

Witnesses:
　F. C. GORE,
　J. D. GARR.